(12) United States Patent
Fima et al.

(10) Patent No.: US 6,510,805 B2
(45) Date of Patent: Jan. 28, 2003

(54) AERIAL REFORESTATION SYSTEM

(75) Inventors: Raoul G. Fima, Oceanside, CA (US); Charles J. Farnham, Oceanside, CA (US); Ralph E. Pope, Jr., Cumming, GA (US)

(73) Assignee: Wetzone Technologies LLC, Oceanside, CA (US)

( * ) Notice: Subject to any disclaimer, the term of this patent is extended or adjusted under 35 U.S.C. 154(b) by 19 days.

(21) Appl. No.: 09/819,405

(22) Filed: Mar. 29, 2001

(65) Prior Publication Data

US 2002/0121562 A1 Sep. 5, 2002

Related U.S. Application Data

(63) Continuation-in-part of application No. 09/796,973, filed on Mar. 2, 2001.

(51) Int. Cl.$^7$ ................................................. B64D 1/18
(52) U.S. Cl. ........................ 111/100; 111/104; 111/118; 111/200; 111/919; 111/920; 239/171; 239/302; 239/550; 239/562; 244/1 R; 244/30
(58) Field of Search .................................. 111/100, 101, 111/102, 104, 105, 114, 118, 127, 200, 900, 915, 919, 920; 239/171, 550, 548, 302, 562; 214/1 R, 24, 30, 31, 138 A

(56) References Cited

U.S. PATENT DOCUMENTS

| | | | | |
|---|---|---|---|---|
| 2,592,052 A | * | 4/1952 | McKenna, Jr. ................. | 47/58 |
| 3,710,868 A | * | 1/1973 | Chadwick ..................... | 169/53 |
| 3,755,962 A | * | 9/1973 | Walters et al. ................. | 47/34 |
| 3,828,857 A | * | 8/1974 | Mason ......................... | 169/53 |
| 3,897,829 A | * | 8/1975 | Eason .......................... | 169/53 |
| 4,333,265 A | * | 6/1982 | Arnold ......................... | 47/74 |
| 4,344,489 A | * | 8/1982 | Bonaparte ..................... | 169/70 |
| 4,936,389 A | * | 6/1990 | MacDonald et al. .......... | 169/53 |
| 4,979,571 A | * | 12/1990 | MacDonald ................. | 169/44 |
| 5,590,717 A | * | 1/1997 | McBay et al. ................. | 169/52 |

* cited by examiner

Primary Examiner—Christopher J. Novosad
(74) Attorney, Agent, or Firm—William B. Noll

(57) ABSTRACT

A reforestation and nourishing practice by the use of a lighter-than-air airship system, for dispersing and planting tree saplings, primarily in remote regions which may have been devastated by fire, where access to such regions by personnel and ground equipment is difficult. The airship system comprises an aerodynamically configured structure having a semi-rigid keel or skeleton, where lift is provided by helium, with the keel mounting a liquid management mechanism consisting of a reservoir open to the outside for resupply of liquid or water, a conduit leading to a holding tank, and a piping distribution and nozzle assembly below the airship system to spray or dispense the liquid or water over selected areas to water or nourish the newly planted trees. The mechanism for temporarily storing and eventually dispensing the tree saplings is a rack mounting at least one cylindrical canister containing plural compartments. The cylindrical canister includes a sliding cover that is operable to open and close one compartment to allow stowage and release of the tree saplings.

10 Claims, 7 Drawing Sheets

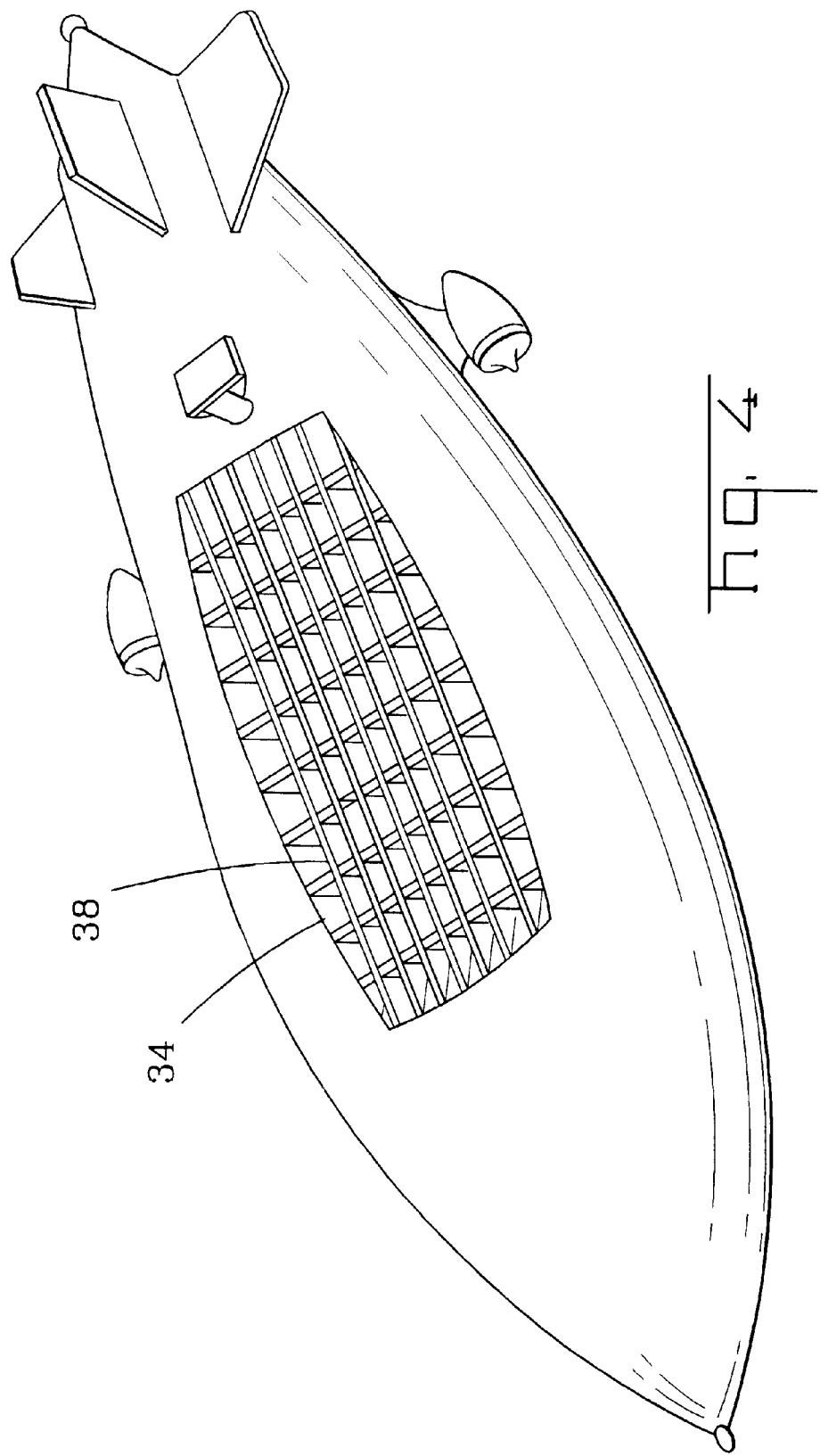

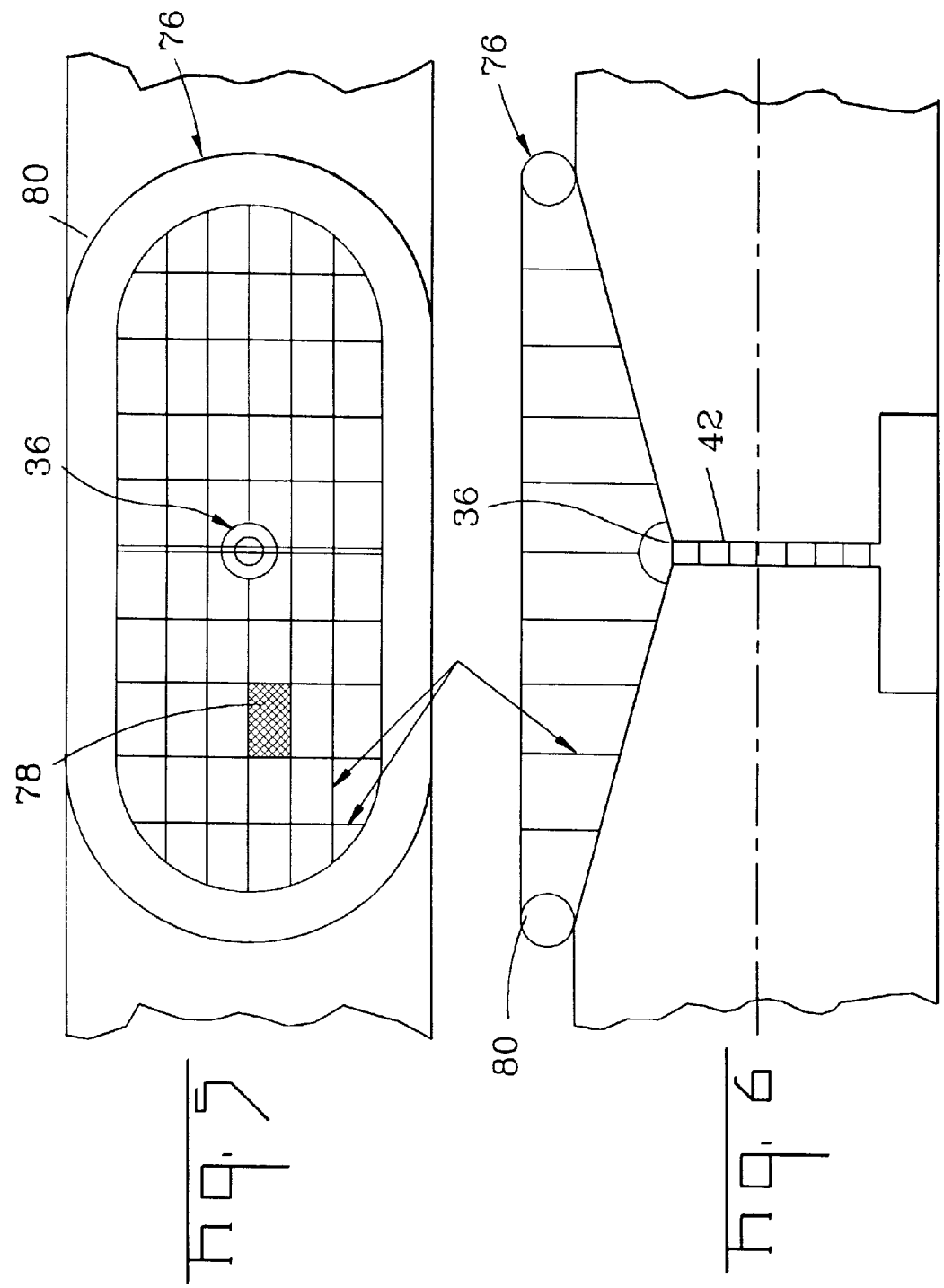

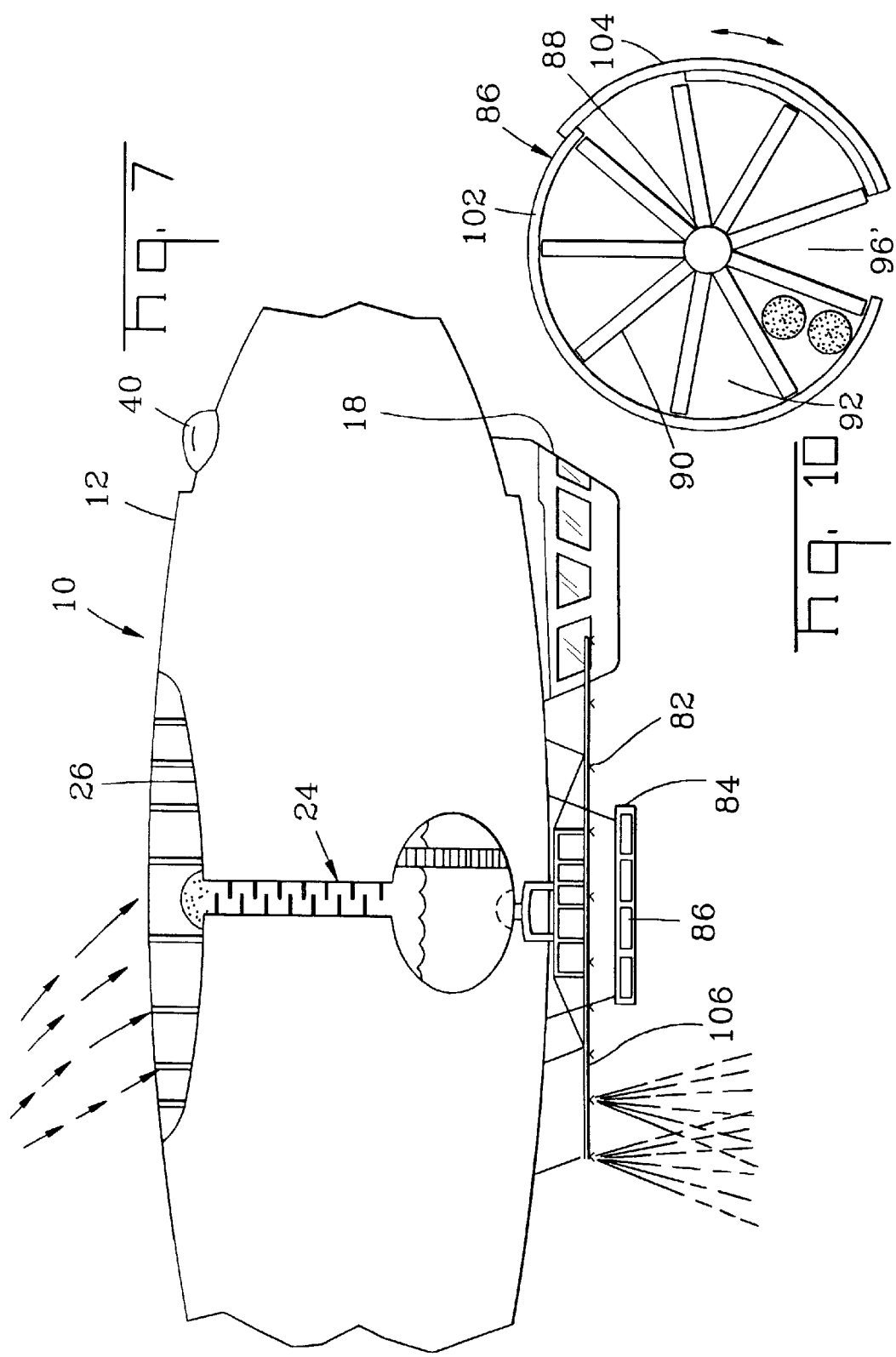

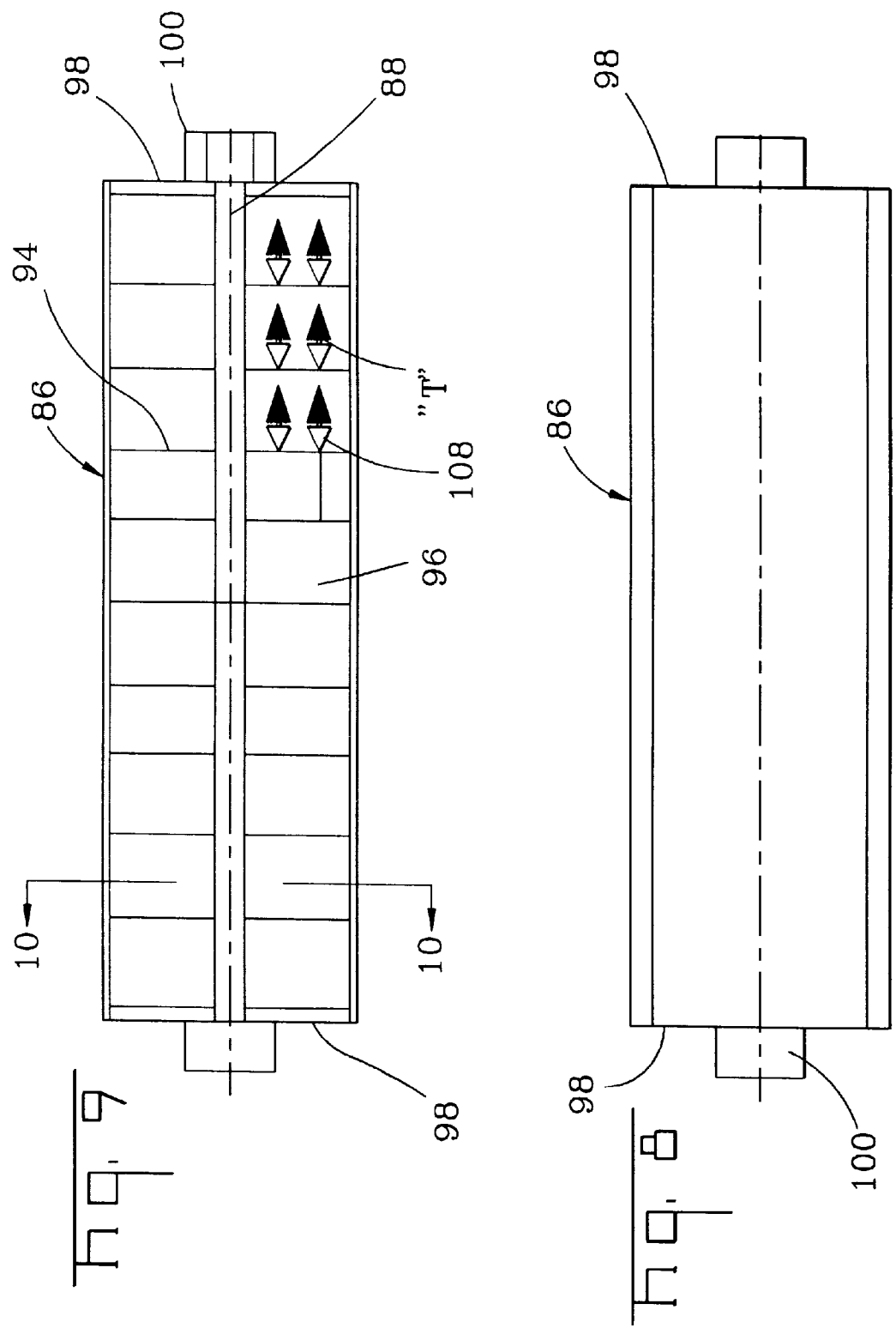

AERIAL REFORESTATION SYSTEM

RELATED APPLICATION

This application is a continuation-in-part of Ser. No. 09/796,973, filed, Mar. 2, 2001, now pending, by the inventors hereof, under the title, "Lighter-Than-Air Water Dispensing Airship For Fire Control", where the contents thereof are incorporated herein in their entirety.

FIELD OF THE INVENTION

This invention is directed to the field of reforestation by an airship, including a continuing watering source in the reforestation process.

BACKGROUND OF THE INVENTION

The present invention relates to a lighter-than-air, airship that offers particular utility as a system for reforestation after a devastating fire, such as in mountain regions where access by land vehicles is not convenient. Vast and furious forest fires are an unfortunate fact of life for many people, especially in the western states of the United States.

Forest fires are presently controlled by ground personnel using backfires and fire breaks, and by air drops of fire-fighting materials from helicopters and fixed wing airplanes. These methods put large numbers of personnel at risk and the payloads of fire-fighting aircraft are very small. The air drops are high impact, which are a danger to ground personnel and particularly inefficient because they are so concentrated. They are the equivalent of dropping a pail of water on a stadium fire. With time and much effort, the fire is extinguished leaving a large burned and charred area. Replanting becomes the order of the day, but access to such an area is difficult or impossible by land vehicles and personnel.

There are a number of different airborne type apparatus that is known for fighting fires, but none are suitable for the follow up task of reforestation. Such types of apparatus are illustrated and described in the following U.S. Patents:

a.) U.S. Pat. No. 3,710,868, to Chadwick, teaches a bucket, for suspension from the cargo hook of a helicopter, where the bucket is provided with a plurality of valves and valve actuating means presenting a low profile and compact construction. The valve actuating means depend from arms extending inwardly from the bucket sides.

b.) U.S. Pat. No. 3,828,857, to Mason, relates to a container which may be filled by immersing the lower portion thereof into a fluid and allowing the fluid to enter the container through a main valve and a number of one-way secondary valves in this lower portion. The main valve is connected to a float which closes the valve when a predetermined level of fluid has entered the container. The secondary valves are closed by the action of the fluid when the container is raised from the reservoir of fluid. The main valve is held closed by a latch mechanism which may be tripped from a remote station allowing the valve to open and discharge the fluid from the container.

c.) U.S. Pat. No. 3,897,829, to Eason, describes an airborne fire suppression unit adaptable for installation on an aircraft, particularly, a helicopter, for fighting fires in locations inaccessible to other types of fire fighting equipment. The fire suppression unit comprises a fluid reservoir tank mountable on the floor within the aircraft body, a boom assembly having a nozzle mounted thereon adaptable for coupling with the reservoir tank and a motor-driven pump for directing fluid under pressure from the tank to the nozzle, all adapted for rapid detachable mounting to the aircraft. The boom assembly is mountable so as to extend the nozzle laterally from the aircraft, and is rotatably connected at its mounting point so as to reciprocate laterally with respect to the aircraft. The nozzle is pivotally secured to the extended end of the bottom to reciprocate in a substantially vertical plane. Manually powered control means, operable from within the aircraft to regulate the position of the boom assembly and nozzle, respectively, are provided. A suction conduit coupled with the pump inlet port and adaptable to extend from the helicopter into a body of fluid is provided to permit rapid refilling of the reservoir tank while a fire is in progress. Selectable valve means coupling the pump with the nozzle, tank and suction conduit, respectively, permit the pump to direct fluid either from the tank to the nozzle for fire-fighting purposes, or from the suction conduit to the tank for refilling purposes, or alternatively recirculate the fluid through the tank when neither the nozzle nor suction conduit are being utilized.

d.) U.S. Pat. No. 4,344,489, to Bonaparte, is directed to a forest fire extinguishing device comprising a projectile filled with an inert gas under pressure which is dropped into a fire and automatically disperses the gas. When the device impacts the ground, a plurality of ports are simultaneously opened, allowing the fire extinguishing material to be expelled over a prescribed area.

e.) U.S. Pat. No. 4,936,389, to MacDonald et al., teaches a fluid dispensing system for an aircraft. The system, between the open and closed positions, includes a bottom door panel controlling release of fluid from an airborne container containing the fluid, and is governed by both the height of the fluid in the container and the instantaneous position of the door panel.

f) U.S. Pat. No. 4,979,571, to MacDonald, relates to an apparatus for producing a delayed foaming action in mixed liquids useful as suppressants for fire area control and curtailment of chemical spills. The apparatus is self-powered and sized to be transported to a target area by a variety of land and sea vehicles as delivery platforms. The apparatus is particularly designed for airborne delivery and is especially adaptable to helicopter applications.

g.) U.S. Pat. No. 5,590,717, to McBay et al., describes a fire extinguishing capsule for the cooling and quenching of destructive fires. The fire extinguishing capsule comprises two double-walled hemishapes which are sealed together by an equatorial belt seal which may be ruptured in order to disperse the extinguishant in the capsule. The capsule may be suspended from a hook and ladder system, for example, a helicopter in the case of forest fires, oil well fires, or transported by sled to a fire scene.

It is clear from the foregoing prior art and known experiences that the traditional modes of employing aircraft type systems are limited in function and scope, such as helicopters and fixed wing airplanes, all of which are heavier-than-air. The present invention represents a dramatic departure from the traditional modes and uses of a lighter-than-air vehicle, particularly in the reforestation of devastated fire areas, with means for the continuous supply of water to enhance planting and nourishing process. The manner by which the present invention brings these goals to fruition will become more apparent in the description which follows, especially when read in conjunction with the accompanying drawings.

SUMMARY OF THE INVENTION

This invention relates to a lighter-than-air, tree planting and water dispensing airship system for reforestation of devastated fire areas, where access by vehicles may be limited. It should be noted that a preferred embodiment for the system hereof is that of fighting fires, the subject of the co-pending application. However, an alternate embodiment for the system hereof, lies in the use of the lighter-than-air airship for aerial planting of tree saplings, the focus of this application. Further uses are contemplated by the system hereof, such as fertilizing large fields, insect spraying along coastal or swampy regions, irrigation, air quality measurement and monitoring. Notwithstanding the above, reforestation of devastated fire areas remains the preferred alternative in the lighter-than-air airship system of this invention.

The system of the invention comprises a lighter-than-air airship which is a gas containing envelope supported by a semi-rigid keel or skeleton. Helium is contained therewithin as the lifting force for the airship. Externally, the airship features a pilot cabin, plural engines, and stabilizing means for controlling the steering and hovering of the airship. In this preferred alternate embodiment, the airship system includes a liquid storage and distribution mechanism, including an externally accessible reservoir for resupplying or replenishing the liquid for eventual distribution over the reforested area. The liquid storage and distribution mechanism includes a storage tank in communication with the externally accessible reservoir, and a liquid distribution manifold extending from the storage tank to below the airship for supplying water to the distributed tree saplings. To effect distribution and planting of the tree saplings, the airship is fitted with at least one tree pouch release canister. The canister, horizontally disposed and secured to the undercarriage of the airship, has longitudinal loading and dispensing slots, plus plural rotating radial vanes and fixed bulkheads to form chambers for receiving one or more tree saplings. A sliding cover is used to allow the saplings to be loaded. Once loaded, the cover is closed which opens the bottom slot for tree sapling distribution. There are many other methods of tree sapling storage and release. This preferred method was chosen to minimize individual release mechanisms and signal paths.

Accordingly, an object of this invention is to provide a lighter-than-air airship system that includes a large payload capacity to deliver and distribute a plurality of tree saplings to remote areas, especially those areas devastated by fire.

Another object hereof is the provision of a means to provide refilling of the water payload while the airship system remains in flight, thus providing an endless supply of water to the planted areas.

A further object of the invention lies in the use of a canister, secured to the undercarriage of the airship for receiving plural tree saplings, having a rotating axle/radial vane, tree sapling distribution system.

These and other objects of the invention will become more apparent from the specification and drawings which follow.

BRIEF DESCRIPTION OF DRAWINGS

FIG. 4 is a top perspective view of the lighter-than-air vehicle of FIG. 1 showing one embodiment for the open water receiving reservoir forming part of the water distribution mechanism of this invention.

FIG. 5 is an enlarged, partial plan view for a filtering screen between the water receiving reservoir and the water tank hereof.

FIG. 6 is an enlarged, partial side view of the filtering screen of FIG. 5.

FIG. 7 is a partial side view, with parts removed, showing a lighter-than-air ship of this invention modified with multiple tree sapling rack, containing plural canisters, for distributing and planting tree saplings over an extended area.

FIG. 8 is a a plan view of a canister for mounting to the tree sapling rack.

FIG. 9 is an axial sectional view of the canister of FIG. 8.

FIG. 10 is a transverse sectional view taken along line 10—10 of FIG. 9, showing plural, rotating radial vanes to define plural compartments, and a sliding cover about the periphery of the canister.

DETAILED DESCRIPTION OF PREFERRED EMBODIMENT

Figure 1:
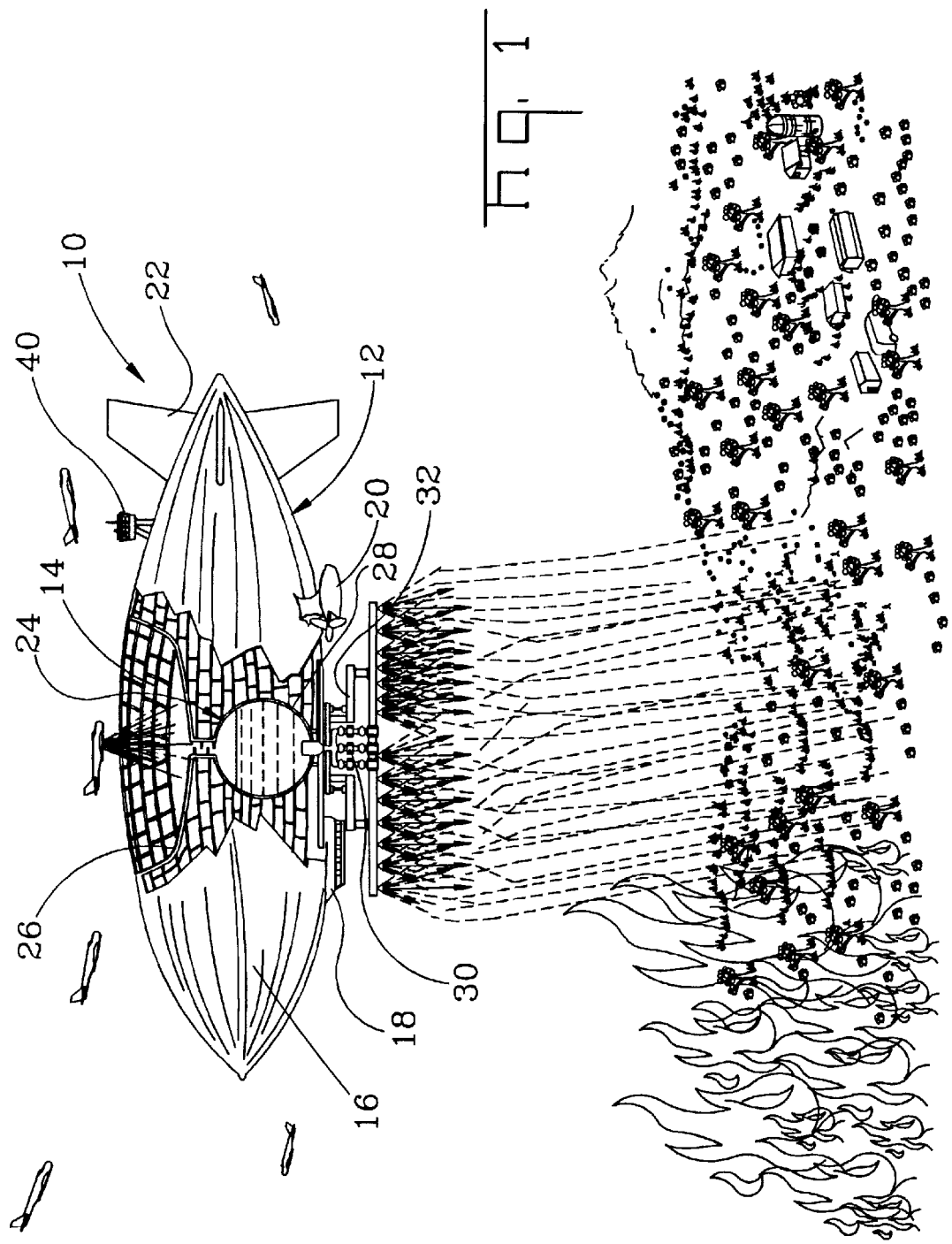
FIG. 1 is a side view, with portions removed to reveal certain internal details, illustrating the operating system for the lighter-than-air vehicle of this invention, as it may be employed to plant tree saplings.

The present invention is directed to a lighter-than-air airship system having an alternate preferred application as a vehicle for distributing and planting tree saplings at remote areas, such as those that have been devastated by fire. To assist in understanding this alternate application, the airship system, with its details and variations, will now be described with regard to the accompanying Figures, where like reference numerals represent like components or features throughout the various views.

Turning now to the several Figures, FIG. 1 illustrates the preferred airship system 10 in one operating mode, i.e. applying water to a raging fire on the ground, where this application is the subject of said co-pending, parent application. The airship system 10 comprises a lighter-than-air vehicle 12 aerodynamically shaped to fly and hover over the ground. The vehicle includes a semi-rigid keel or 14 encased in a flexible skin 16, within which are closed modules or spheres containing helium, a non-combustible lighter-than-air gas, as known in the art. The airship system 10, to facilitate flying and hovering, further includes a pilot's cabin 18 for the flying personnel. Additionally, the airship system 10 incorporates a plurality of engines 20 and a tail stabilizing assembly 22, each of which are known in the art, to provide 3-axis stability and control. Pitch stability control of the airship system is maintained by weight transfers systems and ballasting where payload and ballast weight can be exchanged, practices known in the art.

Figure 2:
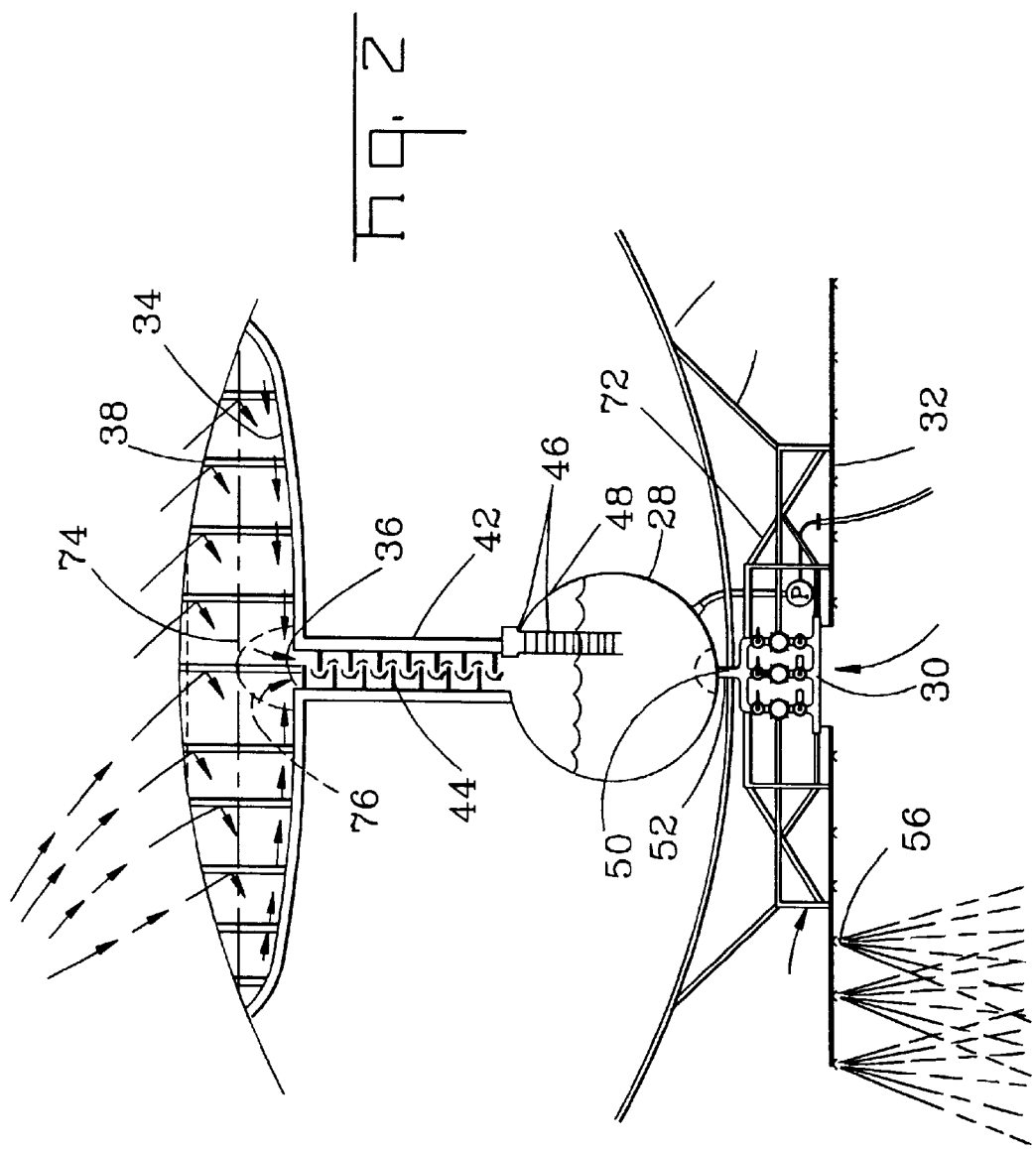
FIG. 2 is an enlarged, partial sectional view of the lighter-than-air vehicle of FIG. 1, showing the water receiving reservoir in communication with a water tank and water distribution mechanism.

Disposed essentially internally of the airship system 10 is a liquid management mechanism 24 comprising a reservoir 26 or catch basin having a sheet surface stabilized by webs, holding tank 28, manifold 30, and distribution piping and nozzles 32. As further seen in FIGS. 2 and 4, the reservoir or catch basin is an internal recess 34 having a central drain 36 with a surface grate 38. It will be appreciated, as best illustrated in FIG. 1, that as a tanker type airplane deposits water in large quantities, it is important that means be provided to disperse and damp the incoming air-dropped delivery dynamics of the incoming water. That is a major function of the surface grate 38 and the flexible sheet surface of the reservoir. To control the re supplying traffic above the airship system 10 hereof, an air control observation dome 40 is provided.

Extending from the central drain 36 is a conduit 42 containing a series of alternating, opposing baffle elements 44 down to the holding tank 28 to absorb shock from the descending water. The holding tank 28, disposed essentially along the center of gravity of the airship system 10, is the direct source for the liquid, i.e. water, to be distributed through the manifold 30 and eventually through the distribution piping and nozzle assembly 32. Since the airship system hereof may be quite large, on the order of 300 yards in length, the holding tank 28 can have a large capacity. For airship systems of this size, the holding tank 28 may include an access door 46 with a ladder 48 to allow for personnel to enter the holding tank for cleaning and inspection. A final feature of the holding tank 28 is a lower drain opening 50 and conduit 52 which leads to the distribution piping and nozzle assembly 32.

Figure 3:
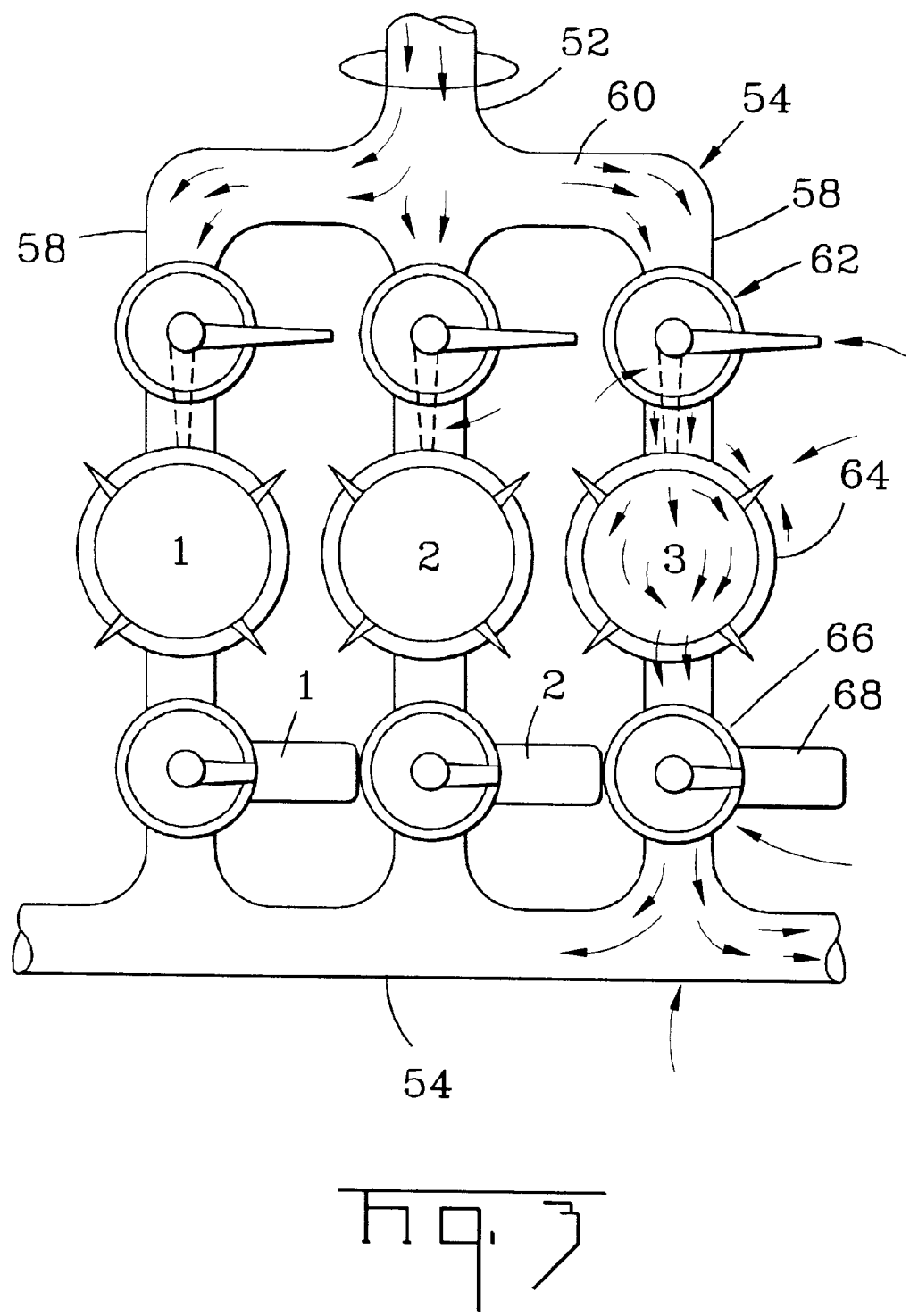
FIG. 3 is an enlarged side view of a water manifold for the water distribution mechanism.

The distribution piping and nozzle assembly 32 includes a manifold 54, see FIG. 3, connected directly to the conduit 52. Though not illustrated, as an alternative, the conduit 52 may include a remotely operated control valve to control the water feed through the distribution piping line 54, such as rectilinear or radial form, to the nozzles 56, which may include water pressure driven rotating or sweeping irrigation nozzles, spiral feeders or side ejection nozzles, all of which are known in the art. The manifold 54, in a preferred embodiment, comprises plural, parallel segments 58 leading from a feeding line 60, which in turn is in communication with conduit 52. The respective segments 58 terminate to a single distribution piping line 54. However, each said segment 58 may include a manual or electrically operated ball valve 62 (closed position shown in FIG. 3, with opened position shown in dotted lines), an intermediate removable filter screen 64 for cleaning, and finally an electrically controlled ball valve 66 with motor 68 for controlled water distribution. Extending from the single or plural distribution piping line 54 are plural nozzles 56, the design of which are well known in the art. To provide structural stability to the distribution piping and nozzle assembly 32, a network support 72 may be included by suspending same from the belly of the airship.

It will be appreciated that when the refilling vehicles, i.e. airplanes and helicopters, quickly fill its tanks with water, such as from a river or lake, where it is likely that some debris, fish or flow restricting contaminants may enter into the tanks. Accordingly, a series of filters and screens, from coarse to fine, may be provided to protect the liquid management mechanism 24 and to ensure its free flowing operation. The reservoir 26 may include screens and baffles 74, 38, respectfully, made of a polycarbon material, spaced above the central drain 36, where a second purpose of the screen 74 is to withstand, in part, the impact of the entering water deposited by aircraft, see FIG. 1. At the central drain a further screen 76 may be provided, where FIGS. 5 and 6 illustrate two views of the latter screen. The screen 76 includes a screen lattice 78 surrounded by a slosh wall 80 to help control and direct the water to the conduit 42 and holding tank 28.

FIGS. 7 through 10 illustrate the details of the alternate embodiment for the modification of the lighter-than-air airship system of this invention for effecting the process of reforestation of remote areas devastated by fire, for example. The airship system 10, including the liquid management system 24, as described above, is important to the alternate embodiment. Further features of the alternate embodiment comprises an undercarriage frame 82, secured to or suspended from the underside of the airship body, more precisely the semi-rigid keel or skeleton 14, to which is secured a canister rack 84, see FIG. 7. Arranged within the rack 84 is at least one elongated, cylindrical canister 86, see FIGS. 8 through 10.

The cylindrical canister 86 comprises a rotating axle 88 having a plurality of axially positioned, spaced apart, radial vanes 90, where a preferred radial movement is 40° to produce nine elongated chambers 92, which align with two longitudinal slots. Additionally, plural transverse partitions 94 may be provided to result in a series of separate compartments 96 (FIG. 9), where such compartments are of a size to receive plural tree saplings "T". Finally, the cylindrical canister 86 is provided with end walls 98 from which are axially extended canister mount and bearing assemblies 100, including means for electrically rotating said axle, such as from the cabin 18, for example, as known in the art. As best seen in FIG. 10, the cylindrical canister 86 further includes a fixed, discontinuous wall 102 and a sliding, arcuate shaped cover 104, where, in a preferred embodiment, the arcuate extent of the sliding cover is about 120°. The combined radial degree of the fixed, discontinuous wall 102 and the sliding cover 104 essentially equals one less compartment than the number of radial compartments. By way of example, with nine radial compartments of 40° each, the combined radial extent is about 320°. Note also the directional arrows for the sliding movement of the cover 104 in FIG. 10, where the cover is shown in the upper position to expose the lower compartments 96'. This position of the canister components represent the dispensing and planting mode for the system hereof. It will be appreciated that as the sliding cover 104 is moved clockwise, to cover the exposed compartment, an upper compartment is newly exposed. In this position, the various tree saplings "T" may be loaded into the exposed compartment. With the sliding cover 104 so positioned, the radial vanes 90 may be rotated 40°, counterclockwise, to expose new and empty compartments to receive a new supply of tree saplings "T". This process is repeated until all but one axial series of compartments are filled. The cover 104 is then moved to the upper position, FIG. 10, to expose the lower most compartments 96'. By rotating the axle and attached vanes about 40°, an axial series of sapling containing compartments 96 are opened to allow the release of new tree saplings where desired. It should be understood that if one desires a larger compartment, such as for example 45°, the number of radial compartments will be eight and the radial combination of the fixed cover and sliding cover will be 315°, with the sliding cover about 135°.

Finally, since it may be beneficial to nourish the newly planted tree saplings, an array of spray nozzles 106 is provided in communication with the liquid management mechanism 24, as described above. The liquid may simply be water, or a water solution of nutrients and fertilizer, as known in the art.

As best seen in FIG. 9, the tree saplings "T" feature a tapered balled end 108 that, when dropped from the canister 86, will free fall toward the ground and, by virtue of a cone shape, penetrate the ground sufficiently to ensure a proper growing process. To enhance the growing process, water and/or nourishment is provided from the liquid management mechanism 24, as more fully described above.

It is recognized that variations, changes and modifications may be made to the aerodynamic design of the airship system and components of this invention without departing from the spirit and scope thereof. For example, a side opening reservoir or catch basin my be incorporated into the airship system. Accordingly, no limitation is intended to be imposed thereon except as set forth in the accompanying claims.

What is claimed is:

1. A lighter-than-air airship system for distributing and planting tree saplings while in a flight mode over defined ground areas, where lift for said airship system is achieved by means of helium confined therewithin, said airship system comprising:
   a.) a semi rigid, light-weight frame encased within a flexible skin and aerodynamically configured for flying and hovering over selected ground areas;
   b.) means for flying said airship system, where said means include a plurality of engines and attitude stabilizing mechanisms to provide 3-axis stability and control;
   c.) an undercarriage frame suspended from said airship system, said undercarriage frame mounting at least one horizontally disposed canister, said canister including
      i.) an intermittantly rotating axle,
      ii.) plural axial vanes extending from said axle to define plural compartments for receiving said tree saplings,
      iii.) a fixed peripheral, circular cover about said compartments having two axially extending slots,
      iv.) a discontinuous, generally circular sliding cover about said vanes and movable between said said slots, and
      v.) a means to rotate said axle relative to said sliding cover to open selective said compartments to store and release the tree saplings contained therewithin; and
   d.) a liquid control and dispensing mechanism in proximity to said undercarriage frame to supply liquid to the defined ground areas.

2. The lighter-than-air airship system according to claim 1, wherein said liquid control and dispensing mechanism comprises:
   a.) a liquid holding tank positioned along the center of gravity of said airship system,
   b.) a manifold in liquid communication with said holding tank, where said manifold includes means for controlling the quantity of liquid passing therethrough, and
   c.) a liquid distribution, piping and nozzle assembly in liquid communication with said manifold.

3. The lighter-than-air airship system according to claim 2, wherein said liquid control and dispensing mechanism further includes a reservoir, open to the exterior of said airship system, for receiving in-flight replenishing of liquid, to feed liquid to said holding tank.

4. The lighter-than-air airship system according to claim 3, including a liquid passing conduit extending between said reservoir and said holding tank, and said conduit includes a series of baffle elements to minimize turbulence in the liquid passing therethrough.

5. The lighter-than-air airship system according to claim 4, including a first debris collecting filtering screen within said reservoir, a second filtering screen between said reservoir and said liquid passing conduit, and a third filtering screen between said holding tank and said manifold.

6. The lighter-than-air airship system according to claim 3, wherein said reservoir is defined by an opening and a predetermined depth, and said opening includes a criss-cross grating member.

7. The lighter-than-air airship system according to claim 1, wherein said means for flying includes a pilot's cabin of a size to receive operating personnel.

8. The lighter-than-air airship system according to claim 1, wherein said canister is essentially cylindrical in shape, and further includes a pair of end walls having bearing assemblies axially extending therefrom.

9. The lighter-than-air airship system according to claim 8, wherein said compartments further are divided by plural transverse partitions.

10. The lighter-than-air airship system according to claim 1, wherein the combined radial extent of said fixed peripheral cover and said sliding cover are less than 360°.

* * * * *